United States Patent [19]

Eibenschutz

[11] Patent Number: 4,457,192
[45] Date of Patent: Jul. 3, 1984

[54] ATTACHMENT TO TRANSFORM A MECHANICAL INTO A SHAFT LATHE

[76] Inventor: Eugenio Eibenschutz, Fresas No. 102, Depto. 602, Mexico, D.F., Mexico

[21] Appl. No.: 366,774

[22] Filed: Apr. 8, 1982

[30] Foreign Application Priority Data

Jun. 18, 1981 [MX] Mexico ................................. 187863

[51] Int. Cl.³ ............................................. B23B 13/00
[52] U.S. Cl. ....................................... 82/2 R; 82/2.5; 82/28 R; 82/45
[58] Field of Search ................ 82/2 R, 2 S, 2.7, 28 R, 82/34 R, 45

[56] References Cited

U.S. PATENT DOCUMENTS

| | | | |
|---|---|---|---|
| 1,455,554 | 5/1923 | Stercklen | 83/34 R |
| 2,853,902 | 9/1958 | Dominguez | 82/34 R |
| 4,217,800 | 8/1980 | Furegati | 82/2.5 |
| 4,383,457 | 5/1983 | Corcoran | 82/2.5 |

*Primary Examiner*—W. D. Bray
*Attorney, Agent, or Firm*—Kurt Kelman

[57] ABSTRACT

In a lathe comprising a lathe bed, a tailstock mounted on the lathe bed at one end thereof, the tailstock carrying a dead center, and a headstock mounted on the lathe bed at a distance from the tailstock at an opposite end thereof, the distance defining the length of the lathe bed, a hollow spindle being rotatably journaled in the headstock and the spindle carrying a live center in alignment with the dead center, the centers being capable of supporting therebetween a workpiece shaft: an attachment for the hollow spindle, the attachment extending from the headstock in a direction away from the tailstock, the attachment being of adjustable length and having an end spaced from the headstock, the attachment end defining a tapered borehole holding the live center for supporting a workpiece shaft having a length exceeding the length of the lathe bed. The attachment permits the shaft to be turned along its entire length in two steps by turning it between the live and dead centers.

6 Claims, 4 Drawing Figures

U.S. Patent  Jul. 3, 1984  4,457,192
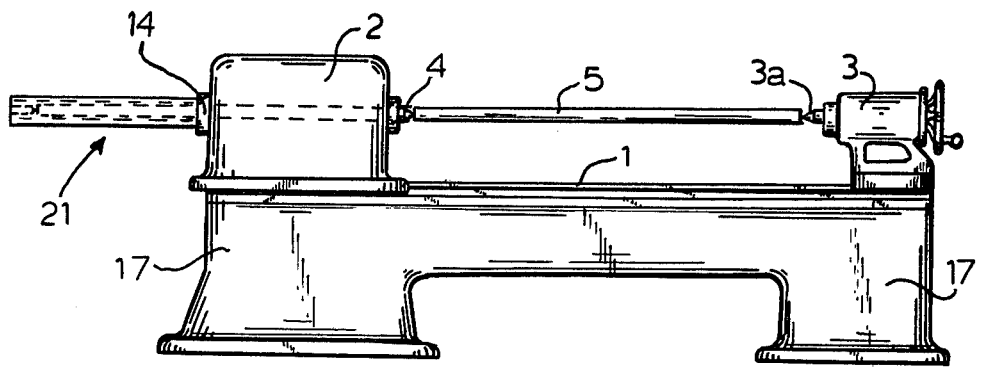
FIG.1
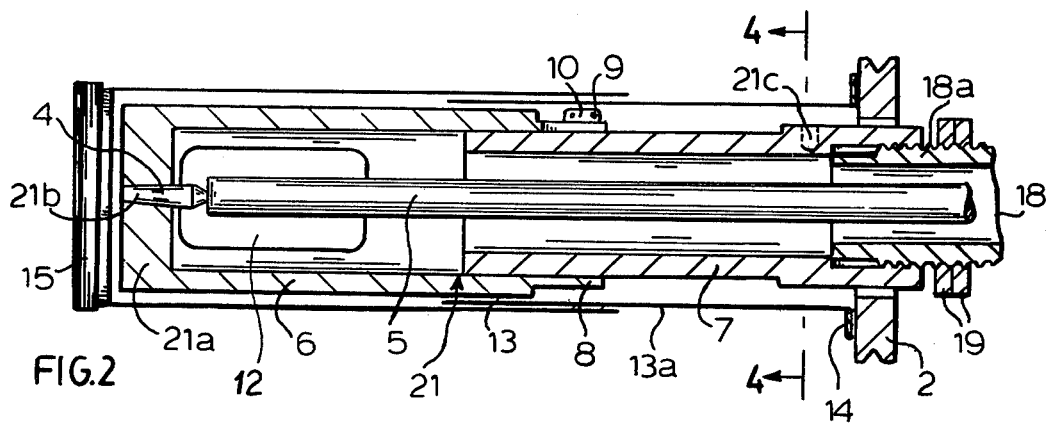
FIG.2
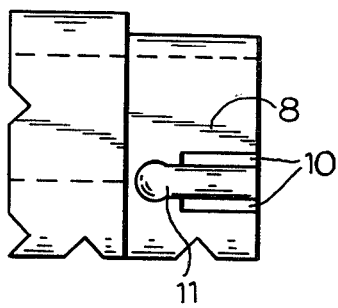
FIG.3
FIG.4
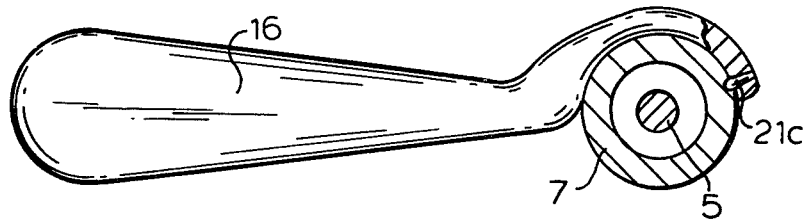

ATTACHMENT TO TRANSFORM A MECHANICAL INTO A SHAFT LATHE

The present invention relates to a lathe attachment for transforming a mechanical lathe into a shaft lathe capable of turning long workpiece shafts.

Essential components of a lathe include a lathe bed, a tailstock mounted on the lathe bed at one end thereof, the tailstock carrying a dead center for the support of one end of a workpiece to be turned, and a headstock mounted on the lathe bed at a distance from the tailstock at an opposite end thereof, the distance defining the length of the lathe bed. A hollow spindle is rotatably journaled in the headstock and the spindle carries a live center in alignment with the dead center for the support of the other workpiece end. The workpiece may be a shaft.

In mechanical lathes, the live center is located where the chuck usually is so that the maximum length of the workpiece to be turned between the centers is determined by the length of the lathe bed minus the length of the tailstock saddle. In modern lathes, the length of the headstock has been increased in relation to the length of the lathe bed, due to the use of increasingly complex gearboxes for turning the live center.

It is the primary object of this invention to enable any simple mechanical lathe to be converted into a shaft lathe capable of turning workpiece shafts of a length exceeding the length of the lathe bed, such as up to twice the length, or more, of the lathe bed between the live and dead centers of the lathe by turning them between the live and dead centers.

The above and other advantages are accomplished according to the invention with an attachment for the hollow spindle. The attachment extends from the headstock in a direction away from the tailstock and is of adjustable length. It has an end spaced from the headstock and the attachment end defines a tapered borehole holding the live center for supporting a workpiece shaft having a length exceeding the length of the lathe bed, for instance having a length up to about twice, or more, the length of the lathe bed.

With such an attachment coupled to the hollow spindle, it is possible to turn much longer workpiece shafts than would otherwise be possible. The length of the attachment is limited only by its mechanical strength, a length accommodating a workpiece shaft having a length up to about twice the length of the lathe bed being normally within practical limits. The tapered borehole at the end of the attachment is a standard borehole permitting the live center to be mounted therein. The attachment defines an axial bore in alignment with the aligned centers of the lathe for receiving the workpiece shaft.

According to a preferred feature of the present invention, the attachment comprises a telescopic hollow shaft defining the axial bore and having a plurality of sections permitting the length of the attachment to be adjusted to the length of the workpiece shaft to be turned.

The above and other objects, advantages and features of this invention will become more apparent from the following detailed description of a now preferred embodiment thereof, taken in conjunction with the accompanying drawing wherein:

FIG. 1 is a schematic side view of a lathe, omitting the conventional cross slide, showing in solid line the longest barstock that may be mounted between the centers of the lathe without the attachment and, in broken line, the extension possible with the attachment;

FIG. 2 is an enlarged axial cross section showing the preferred embodiment of the attachment;

FIG. 3 is a further enlarged illustration of a detail of the attachment; and

FIG. 4 schematically illustrates one way of mounting the attachment on the hollow spindle, the attachment being shown in a transverse section along line IV—IV of FIG. 2.

Referring now to the drawing and first to FIG. 1, there is shown a lathe comprising lathe bed 1 standing on legs 17. Tailstock 3 is mounted on the lathe bed at one end thereof and carries dead center 3a. Headstock 2 is mounted on lathe bed 1 at a distance from the tailstock at an opposite end thereof and the distance defines the length of the lathe bed and correspondingly the maximum length of workpiece 5 which may be turned on the lathe. As more clearly shown in FIG. 2, hollow spindle 18 is rotatably journaled in headstock 2. As is known in modern lathes, the hollow spindle carries two nuts 19, 19 (nut and jamnut) on threaded outer end 18a to hold the spindle against axial play in the headstock 2 whose bearings are not shown in FIG. 2. The spindle carries live center 4 in alignment with dead center 3a for supporting barstock 5 therebetween when the attachment is not used.

The dotted lines in FIG. 1 indicate the total length of a workpiece shaft that may be turned on the lathe by use of the attachment of the invention. The details of a preferred embodiment of the attachment are shown in FIGS. 2 and 3.

Referring to FIG. 2, attachment 21 for hollow spindle 18 is shown to have an axial bore for receiving workpiece shaft 5. As shown in FIG. 1, the attachment extends from headstock 2 in a direction away from tailstock 3. It is of adjustable length and has end 21a spaced from the headstock. The attachment end defines standard tapered borehole 21b holding live center 4 for supporting workpiece shaft 5 having a length up to about twice the length, or more, of the lathe bed, as may be appreciated from the broken line showing in FIG. 1. For this purpose, live center 4 is removed from spindle 18 and installed in borehole 21b.

The preferred attachment illustrated in the drawing comprises a telescopic hollow shaft having a plurality of sections permitting the length of attachment 21 to be adjusted to the length of workpiece shaft 5. While the attachment may have three, four or even more sections, depending on the size of the unit, it has been illustrated in two sections 6 and 7. End hollow shaft section 6 has inner end 8 of reduced diameter whereby this hollow shaft section end attains some elasticity and forms an elastically yielding collar receiving an outer end of hollow shaft section 7, which is friction-fitted into hollow shaft section 6. The elasticity of collar 8 is further enhanced by axially extending slot 11 (see FIG. 3) and radially projecting lugs 10 extend on each side of slot 11, bolts 9 being inserted through bores in lugs 10 to enable split collar 8 to be loosened when it is desired to displace sections 6 and 7 axially to adjust the length of attachment 21 to that determined by the length of workpiece shaft 5 to be turned, the bolts being tightened again after the length adjustment has been made so that collar 8 holds section 7 securely in position in relation to section 6. This provides an easy axial displacement of the two attachment sections in relation to each other for adjustment of the length.

In the illustrated embodiment, the mounting of the attachment on hollow spindle 18 has been made particularly simple by making use of the threaded outer end of the hollow spindle found in most modern lathes. While various ways of coupling attachment 21 to hollow spindle 18 are possible and within the scope of the present invention, the present coupling simply comprises an interiorly screw-threaded end of hollow shaft section 7 opposite to the outer end thereof received in hollowing shaft section end 8, this interiorly screw-threaded hollow shaft section end being screwed onto screw-threaded end 18a of hollow spindle 18 by means of wrench 16 (see FIG. 4) having a claw engaging groove 21c in the circumference of the inner end of hollow shaft section 7.

As shown in FIG. 2, end hollow shaft section 6 defines window 12 at end 21a for providing access to live center 4 whereby an end of workpiece shaft 5 may be place on the live center for support thereon, either manually or, if it is too heavy, by a jack supporting the end of shaft 5 while adjusting the dead center and fixing shaft 5 in place.

Since attachment 21 is threadedly secured to hollow spindle 18, it turns therewith and simply forms an extension thereof, providing protection for live center 4 which is, therefore, subjected to less wear. However, there is potential danger for the machinist and, for this reason, this invention provides a protection cover for the attachment in a preferred embodiment thereof. This protective cover is shown as telescopic protecting tube 13 mounted over telescopic hollow shaft 21. The telescopic protecting tube has first section 13a fixed to the headstock by means of disk 14. Preferably, the protecting tube has the same number of sections as hollow shaft 21 and has the same length, and removable cap 15 is mounted on the second protecting tube section over end 21a of hollow shaft 21. This protective cover will protect the machinist from coming into contact with rotating attachment 21.

Since such portions of the lathe as the cross slide, the steady rest, the follower rest and the slideways are generally conventional and have no bearing on the attachment of the present invention, they have not been illustrated or described, any conventional mechanical lathe being convertible into a shaft lathe by the attachment herein described and illustrated by way of example, various structural modifications functioning in an equivalent manner being within the scope of this invention as defined by the appended claims.

What is claimed is:

1. In a lathe comprising a lathe bed, a tailstock mounted on the lathe bed at one end thereof, the tailstock carrying a dead center, and a headstock mounted on the lathe bed at a distance from the tailstock at an opposite end thereof, the distance defining the length of the lathe bed, and a hollow spindle being rotatably journaled in the headstock: an attachment for the hollow spindle, the attachment extending from the headstock in a direction away from the tailstock, the attachment being of adjustable length and having an end spaced from the headstock and defining a tapered borehole, the spindle or the borehole at the end of the attachment selectively holding a live center in alignment with the dead center, the centers being capable of supporting therebetween a workpiece shaft having a length exceeding the length of the lathe bed.

2. The hollow spindle attachment in a lathe according to claim 1, wherein the attachment comprises a telescopic hollow shaft having a plurality of sections having opposite ends permitting the length of the attachment to be adjusted to the length of the workpiece shaft.

3. The hollow spindle attachment in a lathe according to claim 2, wherein one of the hollow shaft section ends defines a window for providing access to the live center whereby an end of the workpiece shaft may be placed on the live center for support thereon.

4. The hollow spindle attachment in a lathe according to claim 2 or 3, further comprising a telescopic protecting tube mounted over the telescopic hollow shaft, the telescopic protecting tube having a first section fixed to the headstock.

5. The hollow spindle attachment in a lathe according to claim 4, wherein the telescopic protecting tube has the same plurality of sections as the hollow shaft and has substantially the same length as the hollow shaft.

6. The hollow spindle attachment in a lathe according to claim 4, further comprising a removable cap over the end of the hollow shaft.

* * * * *